US008512575B2

(12) United States Patent
Leach et al.

(10) Patent No.: US 8,512,575 B2
(45) Date of Patent: Aug. 20, 2013

(54) METHOD AND APPARATUS FOR COLLECTING BIOLOGICAL MATERIALS

(75) Inventors: Michael D. Leach, Warsaw, IN (US); James M. McKale, Cincinnati, OH (US)

(73) Assignee: Biomet Biologics, LLC, Warsaw, IN (US)

( * ) Notice: Subject to any disclaimer, the term of this patent is extended or adjusted under 35 U.S.C. 154(b) by 0 days.

(21) Appl. No.: 13/567,755

(22) Filed: Aug. 6, 2012

(65) Prior Publication Data

US 2012/0301957 A1 Nov. 29, 2012

Related U.S. Application Data

(60) Division of application No. 13/285,436, filed on Oct. 31, 2011, now Pat. No. 8,236,258, which is a continuation of application No. 11/744,093, filed on May 3, 2007, now Pat. No. 8,048,297, which is a continuation-in-part of application No. 11/210,005, filed on Aug. 23, 2005, now Pat. No. 7,771,590.

(60) Provisional application No. 60/900,758, filed on Feb. 9, 2007.

(51) Int. Cl.

| | |
|---|---|
| ***B01D 21/26*** | (2006.01) |
| ***B01D 17/038*** | (2006.01) |
| ***B04B 5/02*** | (2006.01) |
| ***B04B 7/12*** | (2006.01) |

(52) U.S. Cl.
USPC ..... 210/787; 210/782; 210/360.1; 210/380.1; 494/37

(58) Field of Classification Search
USPC .................. 210/787, 788, 360.1, 380.1, 780, 210/781, 782; 494/37; 436/177–178; 422/547, 422/548, 549, 550, 918, 72, 533, 527, 500
See application file for complete search history.

(56) References Cited

U.S. PATENT DOCUMENTS

| | | | |
|---|---|---|---|
| 280,820 | A | 7/1883 | Hickson et al. |
| 593,333 | A | 11/1897 | Park |
| 3,409,165 | A | 11/1968 | Creith |
| 3,508,653 | A | 4/1970 | Coleman |
| 3,545,671 | A | 12/1970 | Ross |
| 3,814,248 | A | 6/1974 | Lawhead |
| 3,896,733 | A | 7/1975 | Rosenberg |
| 3,897,343 | A | 7/1975 | Ayres |

(Continued)

FOREIGN PATENT DOCUMENTS

| | | | |
|---|---|---|---|
| WO | WO-0061256 | A1 | 10/2000 |
| WO | WO-0183068 | A1 | 11/2001 |

OTHER PUBLICATIONS

Developing Technologies for Accelerating Healing, Naturally® , Smart PReP® 2, Harvest® Technologies Corp. 2002 (6 pages).

(Continued)

*Primary Examiner* — David C Mellon
(74) *Attorney, Agent, or Firm* — Harness, Dickey

(57) ABSTRACT

A method and apparatus can separate and concentrate a selected component from a multi-component material. The multi-component material may include a whole sample such as adipose tissue, whole blood, or the like. The apparatus generally includes a moveable piston positioned within a separation container and a withdrawal tube that is operable to interact with a distal end of the collection container past the piston. Material can be withdrawn through the withdrawal tube.

19 Claims, 9 Drawing Sheets

(56) References Cited

U.S. PATENT DOCUMENTS

| | | | |
|---|---|---|---|
| 3,909,419 | A | 9/1975 | Ayres |
| 3,931,018 | A | 1/1976 | North, Jr. |
| 3,957,654 | A | 5/1976 | Ayres |
| 4,001,122 | A | 1/1977 | Griffin |
| 4,046,699 | A | 9/1977 | Zine, Jr. |
| 4,055,501 | A | 10/1977 | Cornell |
| 4,077,396 | A | 3/1978 | Wardlaw et al. |
| 4,152,270 | A | 5/1979 | Cornell |
| 4,187,979 | A | 2/1980 | Cullis et al. |
| 4,303,193 | A | 12/1981 | Latham, Jr. |
| 4,511,662 | A | 4/1985 | Baran et al. |
| 4,818,386 | A | 4/1989 | Burns |
| 4,850,952 | A | 7/1989 | Figdor et al. |
| 4,917,801 | A | 4/1990 | Luderer et al. |
| 4,939,081 | A | 7/1990 | Figdor et al. |
| 5,019,243 | A | 5/1991 | McEwen et al. |
| 5,024,613 | A | 6/1991 | Vasconcellos et al. |
| 5,053,134 | A | 10/1991 | Luderer et al. |
| 5,197,985 | A | 3/1993 | Caplan et al. |
| 5,207,638 | A | 5/1993 | Choksi et al. |
| 5,269,927 | A | 12/1993 | Fiehler |
| 5,271,852 | A | 12/1993 | Luoma, II |
| 5,456,885 | A | 10/1995 | Coleman et al. |
| 5,474,687 | A | 12/1995 | Van Vlasselaer |
| 5,560,830 | A | 10/1996 | Coleman et al. |
| 5,588,958 | A | 12/1996 | Cunningham et al. |
| 5,632,905 | A | 5/1997 | Haynes |
| 5,645,540 | A | 7/1997 | Henniges et al. |
| 5,646,004 | A | 7/1997 | Van Vlasselaer |
| 5,648,223 | A | 7/1997 | Van Vlasselaer |
| 5,663,051 | A | 9/1997 | Vlasselaer |
| 5,707,647 | A | 1/1998 | Dunn et al. |
| 5,707,876 | A | 1/1998 | Levine |
| 5,736,033 | A | 4/1998 | Coleman et al. |
| 5,738,796 | A | 4/1998 | Bormann et al. |
| 5,785,700 | A | 7/1998 | Olson |
| 5,811,151 | A | 9/1998 | Hendriks et al. |
| 5,823,986 | A | 10/1998 | Peterson |
| 5,824,084 | A | 10/1998 | Muschler |
| 5,840,502 | A | 11/1998 | Van Vlasselaer |
| 5,842,477 | A | 12/1998 | Naughton et al. |
| 5,916,743 | A | 6/1999 | Lake et al. |
| 5,938,621 | A | 8/1999 | Kelly et al. |
| 5,955,032 | A | 9/1999 | Kelly et al. |
| 5,958,253 | A | 9/1999 | Holm et al. |
| 6,053,856 | A | 4/2000 | Hlavinka |
| 6,063,297 | A | 5/2000 | Antanavich et al. |
| 6,071,422 | A | 6/2000 | Hlavinka et al. |
| 6,153,113 | A | 11/2000 | Goodrich et al. |
| 6,200,606 | B1 * | 3/2001 | Peterson et al. .............. 424/574 |
| 6,214,338 | B1 | 4/2001 | Antanavich et al. |
| 6,221,315 | B1 | 4/2001 | Giesler et al. |
| 6,264,890 | B1 | 7/2001 | Boehringer et al. |
| 6,280,400 | B1 | 8/2001 | Niermann |
| 6,328,765 | B1 | 12/2001 | Hardwick et al. |
| 6,398,972 | B1 | 6/2002 | Blasetti et al. |
| 6,406,671 | B1 | 6/2002 | DiCesare et al. |
| 6,440,444 | B2 | 8/2002 | Boyce et al. |
| 6,508,778 | B1 | 1/2003 | Verkaart et al. |
| 6,558,341 | B1 | 5/2003 | Swisher |
| 6,629,919 | B2 | 10/2003 | Egozy et al. |
| 6,716,187 | B1 | 4/2004 | Jorgensen et al. |
| 7,608,258 | B2 | 10/2009 | Mishra |
| 7,771,590 | B2 | 8/2010 | Leach et al. |
| 8,048,297 | B2 | 11/2011 | Leach et al. |
| 8,048,320 | B2 | 11/2011 | Leach et al. |
| 8,236,258 | B2 | 8/2012 | Leach et al. |
| 2001/0009757 | A1 | 7/2001 | Bischof et al. |
| 2002/0035820 | A1 | 3/2002 | Farris |
| 2002/0104808 | A1 | 8/2002 | Blasetti et al. |
| 2002/0161449 | A1 | 10/2002 | Muschler |
| 2002/0182664 | A1 | 12/2002 | Dolecek et al. |
| 2003/0050709 | A1 | 3/2003 | Noth et al. |
| 2003/0050710 | A1 | 3/2003 | Petersen et al. |
| 2003/0185803 | A1 | 10/2003 | Kadiyala et al. |
| 2003/0205538 | A1 * | 11/2003 | Dorian et al. ................. 210/787 |
| 2004/0256331 | A1 | 12/2004 | Arking et al. |
| 2007/0075016 | A1 | 4/2007 | Leach |
| 2007/0208321 | A1 | 9/2007 | Leach et al. |
| 2008/0193424 | A1 | 8/2008 | McKale et al. |
| 2010/0255977 | A1 | 10/2010 | Leach et al. |
| 2012/0045823 | A1 | 2/2012 | Leach et al. |

OTHER PUBLICATIONS

GPS® II System brochure, Gravitational Platelet Separation System Accelerating the Body's Natural Healing Process, Cell Factor Technologies, Inc., a subsidiary of Biomet, Inc., Jun. 30, 2005 (16 pages).

GPS® II System, Gravitational Platelet Separation System, "Accelerating the Body's Natural Healing Process," Cell Factor Technologies, Inc., Biomet Europe (2005) 16 pages, http://www.cellfactortech.com/global_products.cfm, printed Sep. 16, 2005.

Symphony II Platelet Concentrate System/PCS brochure; "Increasing bone graft bioactivity through reproducible concentrations of natural growth factors," DePuy (Jan. 2003), 8 Pages.

* cited by examiner

METHOD AND APPARATUS FOR COLLECTING BIOLOGICAL MATERIALS

CROSS-REFERENCE TO RELATED APPLICATIONS

This application is a division of U.S. patent application Ser. No. 13/285,436 filed on Oct. 31, 2011, now U.S. Pat. No. 8,236,258 issued Aug. 7, 2012, which is a continuation of U.S. patent application Ser. No. 11/744,093 filed on May 3, 2007, now U.S. Pat. No. 8,048,297 issued on Nov. 1, 2011, which is (a.) a continuation-in-part of U.S. patent application Ser. No. 11/210,005 filed on Aug. 23, 2005, now U.S. Pat. No. 7,771,590 issued on Aug. 10, 2010; and (b.) also claims the benefit of U.S. Provisional Application No. 60/900,758, filed on Feb. 9, 2007. The disclosures of the above applications are incorporated herein by reference.

FIELD

The present teachings relate generally to collection of selected biological materials, in particularly to a method and apparatus for separating and collecting a selected biological component.

BACKGROUND

Various biological materials, such as whole blood, adipose tissue and the like, are formed of a plurality of components or fractions. These various fractions can be collected and separated from an anatomy, such as a human anatomy, using various techniques. Nevertheless, generally known techniques may require a plurality of steps and a large volume of biological materials to obtain a selected biological component.

For example, collecting a selected component of whole blood or adipose tissue requires collecting a large sample of whole blood or whole adipose tissue and performing several steps to obtain a selected fraction of the whole sample. It may be desirable to obtain a selected volume for a procedure where time and sample quantity are minimal. Therefore, it may be desirable to provide a method and apparatus to obtain a selected volume of a fraction of a biological material in a short period of time from a selected volume.

SUMMARY

A method and apparatus is provided for obtaining a selected fraction or component of a biological material for a use. The apparatus can generally include a container and a solid or porous piston. A withdrawal tube can be permanently or selectively interconnected with the piston to withdraw a selected fraction of a whole material. Generally, the withdrawal tube can pass through a selected portion of the piston, such as a distal end of the piston to obtain a material that is positioned near a distal portion of the container.

According to various embodiments a system to separate a component from a selected material is disclosed. The system can include a separation container operable to contain the selected material having a top and a bottom and a top wall at a proximal end of the separation container that closes the top of the separation container. A piston can be positioned in the separation container. An injection port can extend through the top wall. In addition, a conduit can be positioned in the separation container operable to remove the selected material from a distal end near the bottom of the separation container past the piston.

According to various embodiments a system to separate a component from a selected material is disclosed. The system can include a container having a side wall, bottom wall, and a top wall and defining an interior volume. An input port can extend from the top wall and define a first passage through the top wall to the interior volume. An extraction port can extending from the top wall. A piston can move within the interior volume of the container. In addition, a conduit extending from the extraction port can include a tube extending from the top wall and a passage through the piston.

According to various embodiments, a method of separating a component from a selected material is disclosed. The method can include obtaining the selected material having multiple components and providing a separation system including a tube having a top wall, a piston within the tube, an input port defined through the top wall, an extraction port defined through the top wall, a hollow member extending from the extraction port at least to the piston. The selected material can be positioned in the separation system through the input port with the top wall connected to the tube and between the top wall and the piston. The separation system can be centrifuged while containing the selected material and the piston can move towards the top wall during centrifugation. The component of the selected material can be extracted from past the piston.

Further areas of applicability of the present teachings will become apparent from the detailed description provided hereinafter. It should be understood that the detailed description and various embodiments are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION OF VARIOUS EMBODIMENTS

The following description of the various embodiments is merely exemplary in nature and is in no way intended to limit the teachings, its application, or uses. Although the following teachings relate to adipose tissue, it will be understood that the teachings may apply to any appropriate multi-component material, whether biological or not. It will be further understood that a component can be any appropriate portion of a whole, whether differing in density, specific gravity, buoyancy, structure, etc. The component is a portion that can be separated from the whole.

Figure 1:
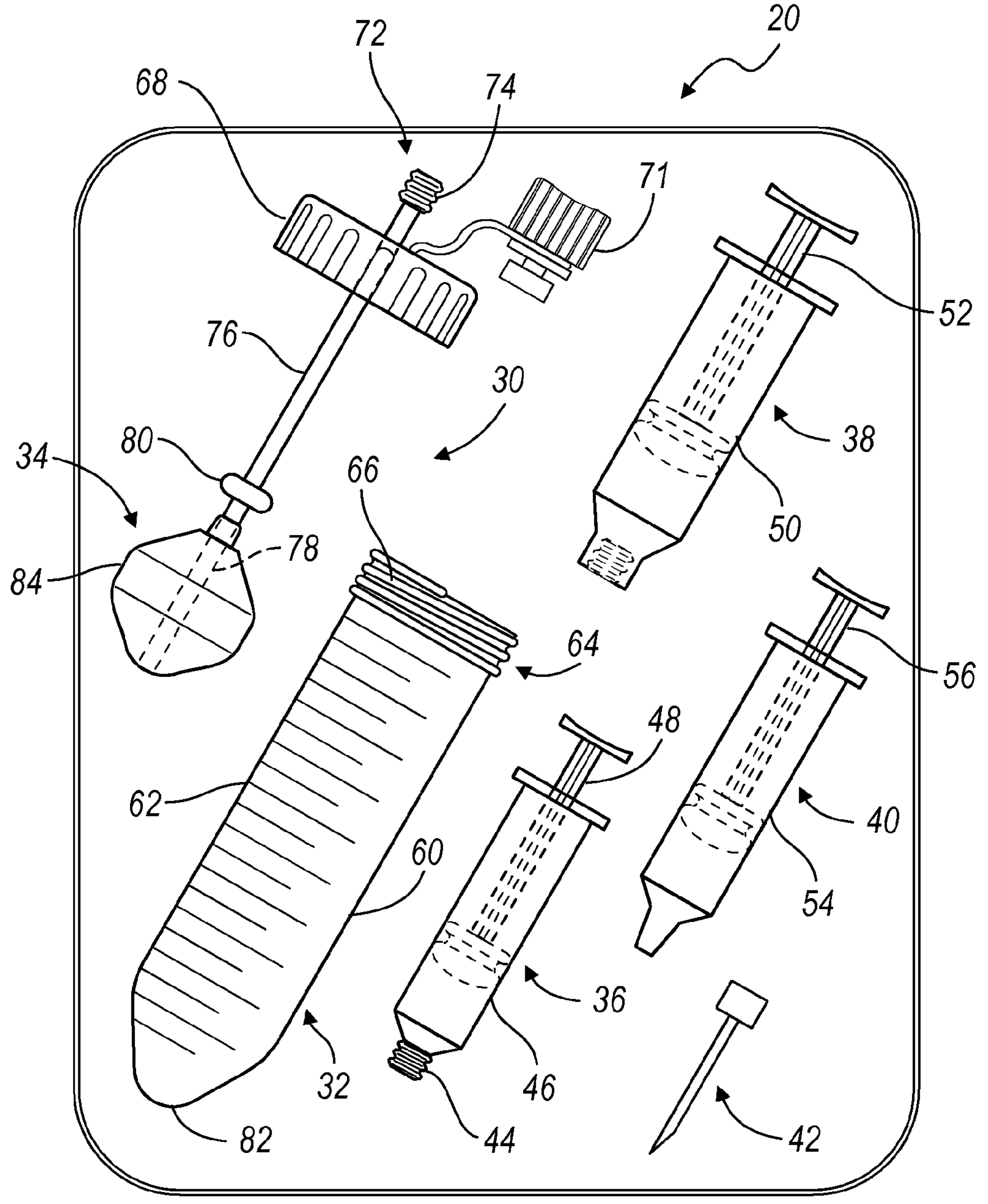
FIG. 1 is a kit of an apparatus according to various embodiments.

With reference to FIG. 1, a kit 20 can be provided to allow for collection, separation, and application of a selected biological material or component. The kit 20 can be understood to include any appropriate devices or materials, and the following devices are merely exemplary. The kit 20 can include a separation device 30 that can be used to separate a selected material, such as an adipose tissue sample, a whole blood sample, or the like. It will be understood that the separation device 30 can be disposable, reusable, or combinations thereof. For example, the separation device 30 can include a container 32 that may be reusable while a separation piston 34 is not. Further, the kit 20 can include a collection device such as a syringe 36, an application device such as a syringe 38, and a mixing material that may be included in a syringe 40. The mixing material may be any appropriate material such as an anti-clotting agent, a clotting agent, an antibiotic, an enzyme, a buffer, a growth factor or factors, or the like. It will be understood that the kit 20 may also include any other appropriate materials such as bandages, tourniquets, sterilization materials or the like. It will be further understood that the kit 20 may be provided sterilized, prepared for sterilization, or any appropriate combination thereof.

The various syringes 36, 38, 40, may be any generally known syringe. The syringe 36 may also be interconnectable with a needle or cannula 42 that can interconnect with a luer fitting 44 of the syringe 36. The syringe 36 can generally include a container 46 and a plunger 48. This can allow the syringe 36 to withdraw a selected sample, such as an adipose tissue sample from an anatomy, such as a human anatomy, for various purposes. The application syringe 38 can also include a container 50 and a plunger 52. The application syringe 38 can be any appropriate syringe and can be of a size to interconnect with the selected portion of the separation device 30, such as discussed herein. Further, the mixing syringe 40 can also include a container 54 and a plunger 56. The mixing syringe 40 can include any appropriate material, such as those described above. The mixing material provided in the mixing syringe 40. The mixing material can be added to the container 32 at any appropriate time for interaction with the selected material that can also be positioned in the separation container 32.

The separation device 30 includes the container or tube 32 that can include various features. For example, container 32 can be any appropriate size such as 20 ml, 40 ml, 60 ml, any combination thereof, fraction thereof, or any appropriate size. The collection container 32 includes a side wall 60 that can assist in containing the material positioned in the container 32. The tube 32 may also include demarcations 62 that indicate a selected volume.

The sidewall 60 may or may not be flexible under a selected force. For example, the separation device 30 can be positioned in a centrifuge or similar device to apply an increased force of gravity to the material positioned in the tube 32. If the tube 32 is formed of a selected material, the sidewall 60 may flex under the high force of gravity to cause an increased diameter of the tube 32 under the higher force of gravity. Alternatively, the sidewall 60 of the container 32 may be formed of a substantially rigid material that will not flex under a high force of gravity.

The tube 32 further includes a top or proximal portion that defines a cap engaging region 64. The cap engaging region 64 can include a thread or partial threads 66 that can interconnect with a cap 68. The cap 68 can include an internal thread that can thread onto the thread 66 of the top portion 64 to fix the cap 68 relative to the tube 32. Therefore, the cap 68 can be removed from the tube 32, but it will be understood that the cap 68 can also be formed as an integral or single portion of the tube 32. It will be understood that the separating device 30 can be provided as a modular system or can be formed as an integral or unitary member.

Extending through the cap 68 can be a collection or application port 72. The port 72 can include a luer locking portion 74, or any other appropriate interconnection portion. The port 72 can also include or be connected to a cap 71. The port 74 can extend through the cap 68 to a withdrawal tube 76. The withdrawal tube 76 may be formed as a single piece with the port 72 or can be interconnectable with the port 72. Further, the withdrawal tube 76 can extend through the piston 34 through a central channel 78 defined through the piston 34. The withdrawal tube 76 can define a conduit, such as an extraction conduit. One skilled in the art will understand that a separate tube or cannula can be passed relative to the piston 34 for withdrawal of a material or component of the sample. Thus, the withdrawal tube 76 need not be maintained in the tube 32 for an entire procedure.

The withdrawal tube 76 can, but is not required to, define a piston stop or stop member 80. The stop 80 can act as a stop member for the piston 34 so that the piston 34 is able to move only a selected distance along the withdrawal tube 76. The stop 80 can also be formed by any appropriate portion, such as the sidewall 60. The stop 80 is provided to assist in limiting a movement of the piston 34. Therefore, it will be understood that the withdrawal tube 76 may also act as a rod on which the piston 34 is able to move.

The piston 34 can include any appropriate geometry such as a geometry that substantially mates with the tube 32, particularly a distal end 82 of the tube 32. The distal end of the tube 32 can be flat, conical, tapered, etc. It will be understood, however, that the piston 34 can also include any other appropriate geometry to interact with the tube 32. Further, the piston 34 can include a contacting or central region 84 that includes an outer dimension, such as a circumference or diameter that is generally equivalent to an inner diameter or circumference of the tube 32. Therefore, the piston 34 can contact or engage the sidewall 60 of the tube 32 at a selected time.

The piston 34 can also be formed in any appropriate configuration or of any appropriate material. For example, in addition to the selected geometry of the piston 34, the piston can be porous, non-porous, or include regions of each. For example, the piston 34 can be formed of a porous material such as a screen, a filter, a mesh, or the like. The piston 34, including a porous region, can allow a selected material to pass through and not allow other non-selected materials to pass. The piston 34, therefore, can selectively separate materials or components of a sample.

The middle or tube engaging portion 84 of the piston 34 can include the dimension that is substantially similar to an unchanged or unforced dimension of the wall 60 of the tube 32. For example, it may be formed so that there is substantially little space or a sliding engagement between the tube engaging portion 84 of the piston 34 and the tube 32. However, under a selected force, such as a centrifugal force, the wall 60 of the tube 32 can be compressed axially and be forced outward thereby increasing a dimension, such as a diameter, of the tube 32. The increasing of the diameter of the tube 32 relative to the piston 34 can allow for a freer movement or non-engagement of the tube 32 with the piston 34. In this way, the piston 34 can move relative to the tube 32 or materials can move between the piston 34 and the tube 32.

For example, as discussed herein, the piston 34 may move relative to the tube 32 when the tube is compressed, thus increasing the tube's 32 diameter. The piston 34 can move relative to the withdrawal tube 76, which can allow the piston 34 to move a selected distance relative to the tube 32 or the cap 68. The stop 80, which is provided on the withdrawal tube 76, can assist in selectively stopping the piston 34 relative to the rod 76. This can define a maximum motion of the piston 34 relative to the withdrawal tube 76.

A selected material, such as a biological material, can be positioned in the tube 32 and the tube 32 can be positioned in a centrifuge with the piston 34. During the centrifugal motion, the tube 32 can compress, thereby increasing its diameter relative to the piston 34. The compression can allow the piston 34 to more easily move relative to the withdrawal tube 76 and the container tube 32. Therefore, the piston 34 can assist in separating a selected material positioned in the container tube 32. Once the centrifugal force is removed or reduced, the axial compression of the container tube 32 can be reduced to thereby return it substantially to its original dimensions. As discussed above, its original dimensions can be substantially similar to those of the piston 34, particularly the tube engaging portion 84, which can hold the piston 34 in a selected position relative to the tube 32. This can assist in maintaining a separation of the material positioned in the tube 32, as discussed herein.

It will be understood that the separation system 30 can be used with any appropriate process or various selected biological materials or multi-component materials. Nevertheless, the separation system 30 can be used to separate a selected biological material such as stromal cells, mesenchymal stem cells, blood components, adipose components or other appropriate biological or multi-component materials. Thus, it will be understood that the following method is merely exemplary in nature and not intended to limit the teaching herein.

Figure 2:
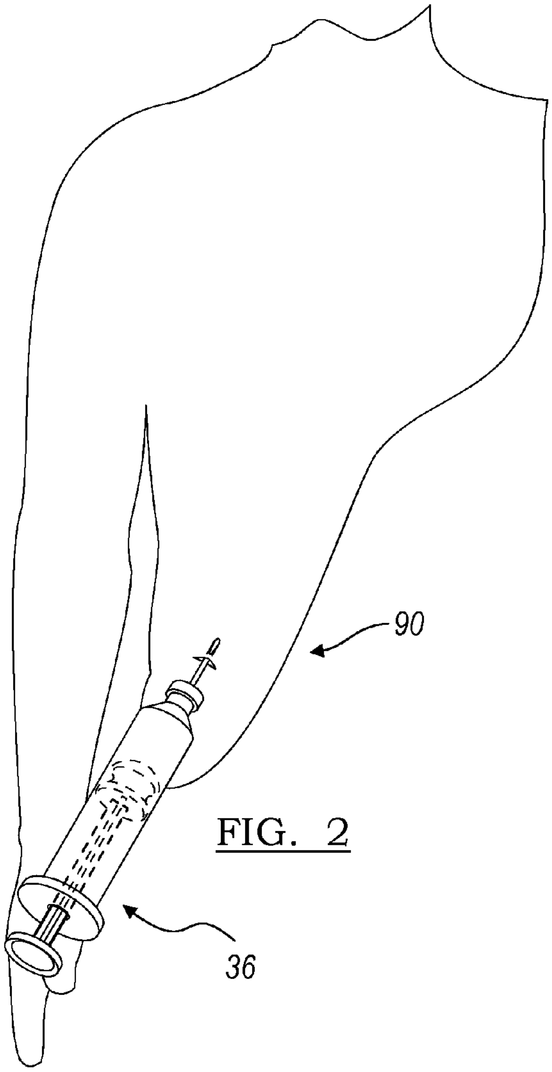
FIG. 2 is an environmental view of a separating device according to the various embodiments.
Figure 3:
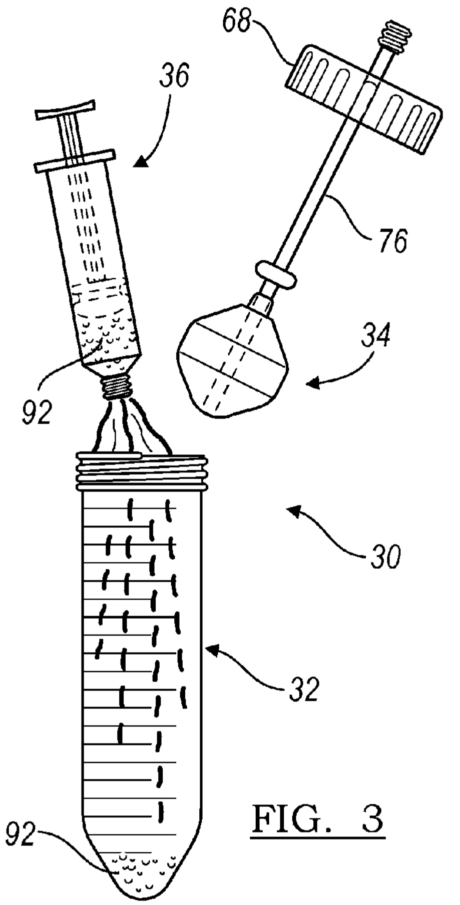
FIG. 3 illustrates the separating device being filled according to various embodiments.

With additional reference to FIG. 2, a patient 90 can be selected. The patient 90 can include an appropriate anatomy and the collection device 36 can be used to collect a selected portion of biological material. For example, the collection device 36 can engage a portion of the patient 90 to withdraw a selected volume of adipose tissue. The adipose tissue can be selected from any appropriate portion of the anatomy, such as from the abdominal region. In addition, various other components may be withdrawn into the collection tube 36, such as whole blood, stem cells, and the like. Further, the collection device 36 can be a plurality of collection devices that each collect different components, such as one to collect adipose tissue, one to collect whole blood, and others to collect other selected biological materials.

Once the selected biological material is withdrawn into the collection device 36, the biological material 92 can be placed into the tube 32. Once the tube 32 has been filled an appropriate amount with the biological material 92, the piston 34, the rod 76, and the cap 68 can be interconnected with the tube 32.

Figure 4:
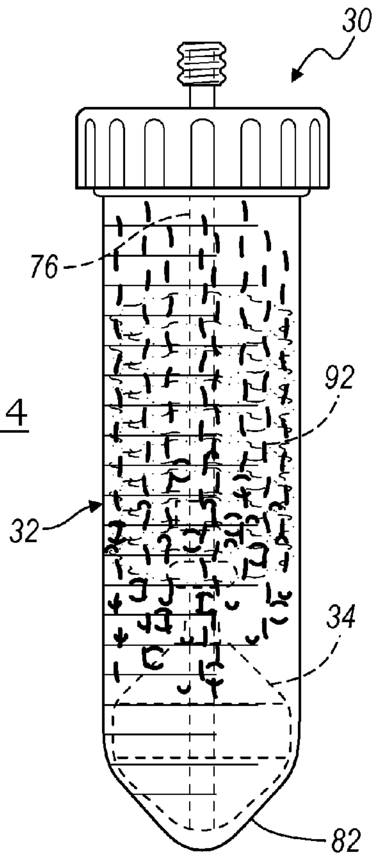
FIG. 4 is an environmental view of a filled separating device according to various embodiments.

With additional reference to FIG. 4, the assembled separation device 30 can be pre-treated prior to various other processing steps. For example, selected components, including enzymes, chemicals, antibiotics, growth factors, and the like, can be added to the container tube 32. Further, the selected material, which can include adipose tissue, can be sonicated or treated with a sonic radiation prior to further processing steps. In addition, or alternatively to sonication, various other agitating methods or devices can be used to mix or agitate the material. For example, a mixing bead, beads, ball, or the like can be placed in the container 32. The container 32 can then be moved with the beads inside to agitate and mix the material. In addition, various rigid arms or extensions can be positioned in the container 32 to assist in agitating or mixing the material.

The sonication of the adipose tissue can perform various steps. For example, the sonication of the adipose tissue can remove or release stromal cells from the adipose tissue cells. It will be understood that sonication of the adipose tissue can be performed at any appropriate time. For example, the sonication of the adipose tissue can be performed once it has been collected into the collection device 36 and prior to being positioned in the tube 32 or after it has been positioned in the tube 32. Further, all of the selected materials, which may include whole blood, various components of whole blood, or the like, can be also added to the tube 32.

Figure 5:
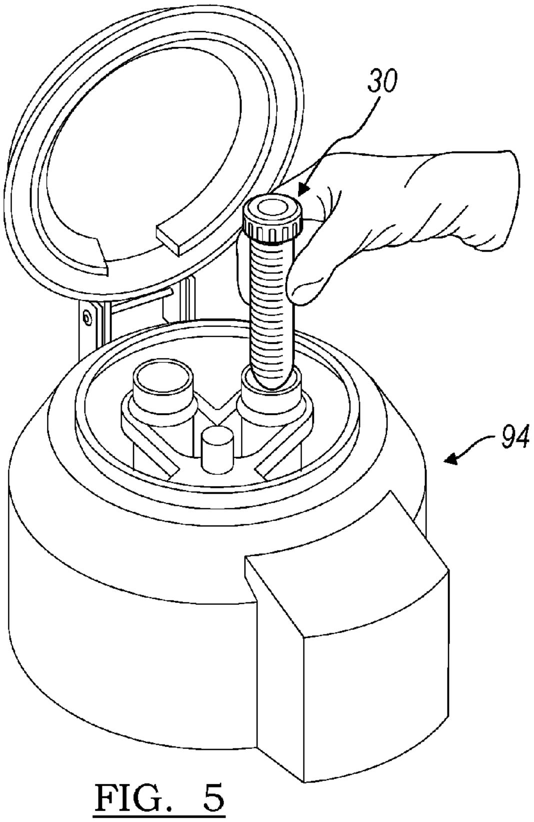
FIG. 5 is an environmental view of a separating device at a centrifuge according to various embodiments.

With reference to FIG. 5, once the separation system 30 has been optionally pre-processed, such as with agitation and/or sonication, various chemicals, various biologically active materials (e.g. enzymes), it can be positioned in an appropriate separation device, such as a centrifuge 94. The centrifuge 94 can be operated according to any appropriate technique to perform a high gravity separation of the material positioned in the separation device 30. Nevertheless, the centrifuge device can be spun at any appropriate rotation per minute (RPM) such as about 2000 to about 4030 RPMs. This can form a force of gravity on the separation device 30 and the various materials positioned therein of about 740 G's to about 3000 G's. Further, the centrifugation step with the centrifuge device 94 can be performed for any appropriate amount of time. For example, the separation device 30 can be spun at the selected RPMs for about 5 to about 15 minutes. It will be understood that one skilled in the art can determine an appropriate RPM and time setting which can be used to separate selected materials positioned in the separation device 30. Further, the separation of different materials may require different RPMs and different separation times.

As discussed above, the piston 34 can be positioned in the tube 32 to assist in separating the materials positioned in the container tube 32. The piston 34 can be formed of any appropriate materials and according to any appropriate physical characteristics. For example, the piston 34 can be formed of a material or combination of materials that can achieve a selected density. The piston 34 can assist in separating, such as physically separating, selected components of the biological material 92 positioned in the separation device 30. For example, the piston 34 can include a density that is about 1.00 grams per milliliter to about 1.10 grams per milliliter, such as less than about 1.06 grams per cc or 1.06 grams per milliliter. The selected density of the piston 34 can assist in separating denser components or components with a higher specific gravity than the piston 34. For example, stromal cells include a specific gravity that is greater than other components of the biological material 92 positioned in the tube 32 and also greater than that of the piston 34. The piston 34, however, can include any appropriate density.

As discussed above, when the separation device 30 is positioned in the centrifuge 94 the centrifuge 94 can be spun. The forces produced by the centrifuge 94 can compress the container tube 32, which can increase its diameter thus allowing the piston 34 to move relative to the container 32. The various components of the biological material 92 positioned in the separation tube 32 can be physically separated by the piston 34 as it moves relative to the separation tube 32. This can assist in moving at least one of the piston 34 or a portion of the biological material 92. Though the biological material can originally be positioned on top of the piston 34, the forces and/or flexing of the sidewall 60 can allow at least a component of the material to move past the piston 34. It will be understood, however, that the sidewall 60 may not flex and that the material is simply forced past the piston 34 between the piston 34 and the sidewall 60. Thus, it will be understood that the material can move past the piston 34 to the distal end 82 to container 32 according to any appropriate method such as flexing the sidewall 60, moving between a space between the piston 34 and the sidewall 60, or any other appropriate method.

Figure 6:
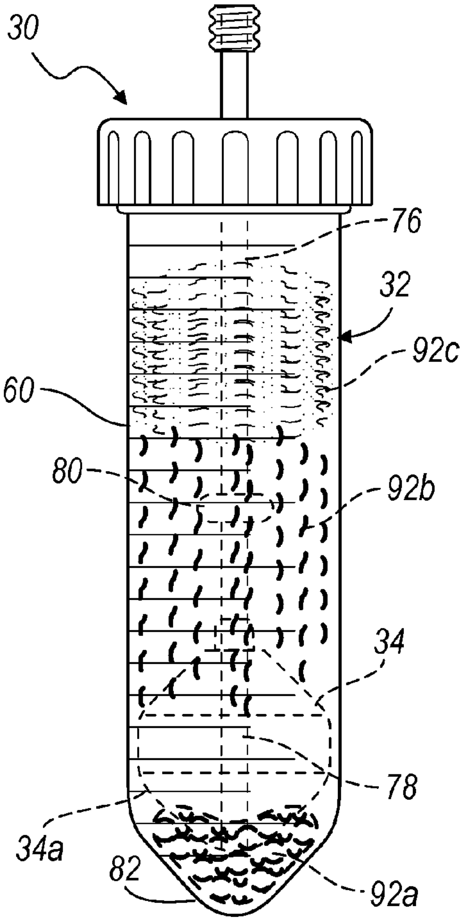
FIG. 6 is an environmental view of a separating device after being centrifuged.

With additional reference to FIG. 6, the biological material 92 can be separated into a plurality of components that are contained within the separation container 32. For example, a first component 92*a* can be positioned between the piston 34, such as a distal end of the piston 34*a* and the distal end of the separation container 82. The first biological component 92*a* can be any appropriate material, including stromal cells, mesenchymal stem cells or the like. If the biological material 92 positioned within the separation tube 32 includes adipose tissue, then various other components can include a plasma and plasma protein component 92*b* and a fat and oil component 92*c*. It will be understood, as illustrated in FIG. 6, that the fat and oil component 92*c* is generally formed near a proximal end of the tube 32 while the denser stromal cells are formed as a cell button near the distal and 82. Further, it will be understood that various materials, including plasma and plasma proteins, may also include a density that is higher than that of the piston 34 and thus may also be formed or moved towards the distal end 82 of the separation tube 32. Nevertheless, the first component 92*a* can include a high concentration of the high density materials that is of a selected material to be separated using the separation device 30, because of the piston 34 and the stop 80.

Figure 6A:
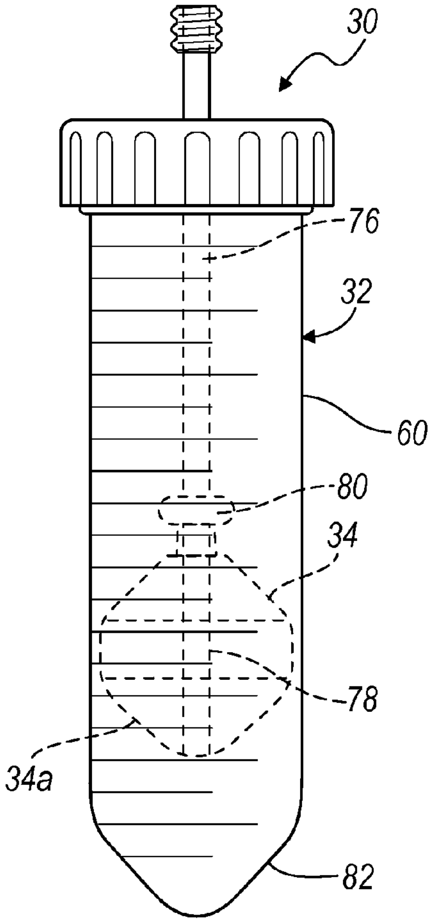
FIG. 6A is a schematic view of a separating device after being centrifuged.

Further, because the various materials, such as plasma or plasma proteins, can include a density that is similar to that of the first component 92*a*, which can include the stromal cells, the stop 80 can extend from the withdrawal tube 76 to ensure a low concentration or low volume of the plasma, plasma proteins, or the materials that may include a density that is greater than that of the piston 34. Although it may be selected to include a selected volume of the plasma or plasma proteins near the distal end 82 of the separation tube 32, such as for withdrawal of the selected cells, such as stromal cells, it may be selected to keep the concentration at a selected amount. Therefore, the stop 80 or other stop or limiting portion (e.g. a lip or edge in the container 32) can assist in achieving the selected volume and concentration of the first component 92*a* to be separated by the separation device 30 as the piston 34 moves towards the stop 80, as illustrated in FIGS. 6 and 6A, where the piston 34 is illustrated to have moved away from the distal end 82 of the container 32.

Figure 7:
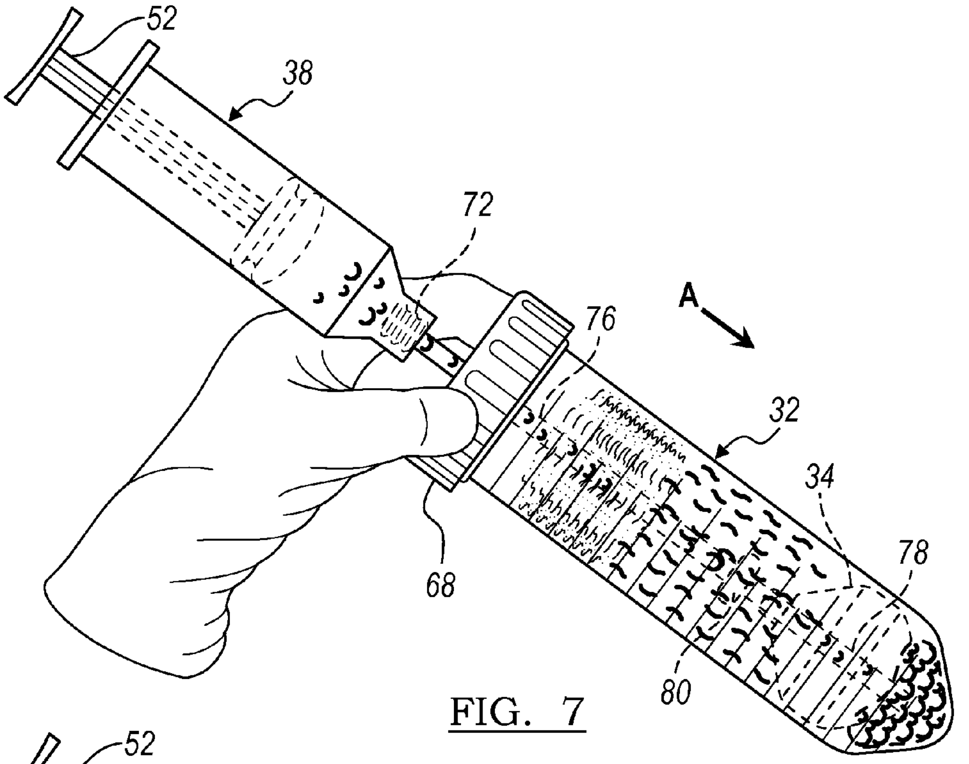
FIG. 7 is an environmental view of material being withdrawn from the separating device according to various embodiments.

With additional reference to FIG. 7, the withdrawal device 38 can be interconnected with the withdrawal port 72 which interconnects the withdrawal device 38 with the withdrawal tube 76. As discussed above, the withdrawal tube 76 can pass through the piston 34. Because the withdrawal tube 76 can be fixed relative to the cap 78, the withdrawal tube 76 may not move during the centrifugation process. This allows the piston 34 to move relative to the separation tube 32 while the withdrawal tube 76 maintains its position, as illustrated in FIGS. 6, 6A, and 7. The withdrawal tube 76 can include a portion positioned generally near the distal portion 82 of the separation tube 32. Therefore, the withdrawal port 72 can be interconnected or operable to remove a material that is positioned near the distal end 82 of the separation tube 32. Though the piston 34 can move proximally and allow for separation of a volume near the distal end 82 of the separation tube 32, the withdrawal tube 76 is still positioned near the distal end 82 of the separation tube 32. Therefore, the collection device 38 can be interconnected with the withdrawal port 72 and used to withdraw the volume of material that is positioned near the distal end of the tube 82, as illustrated in FIGS. 6, 6A, and 7. Thus, the separated material, which can include stromal cells or other appropriate biological components, can be withdrawn after being separated and concentrated with the separation system 30. Other various components, such as the components 92*b* and 92*c* of the biological material 92 can be retained in the tube 32.

Figure 7A:
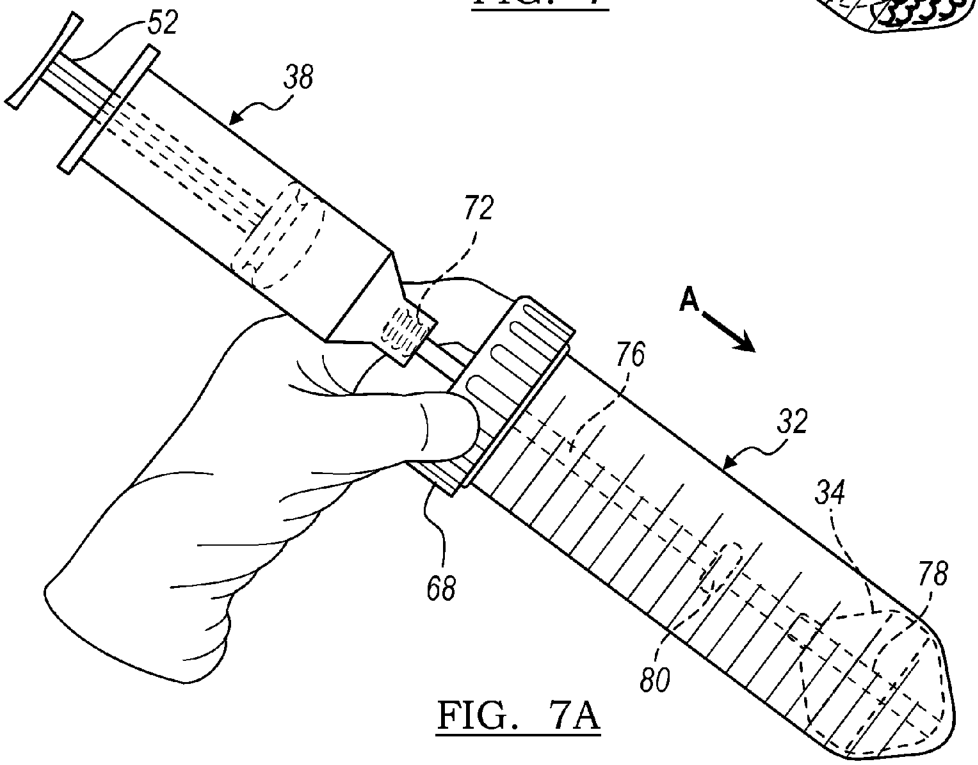
FIG. 7A is a schematic view of the piston in the container while material is being withdrawn from the separating device according to various embodiments.

As the collection device 38 withdraws material from the separation tube 32, the piston 34 can be moved generally in the direction of the arrow A, as illustrated in FIGS. 7 and 7A, away from the stop 80. This can allow for a displacement of the volume being removed into the collection tube 38 as the piston 34 moves in the direction of arrow A towards the distal end 82 of the separation tube 32. Further, this movement of the piston 34 can assist in withdrawing the material from the distal end 82 of the separation tube 32.

Figure 8:
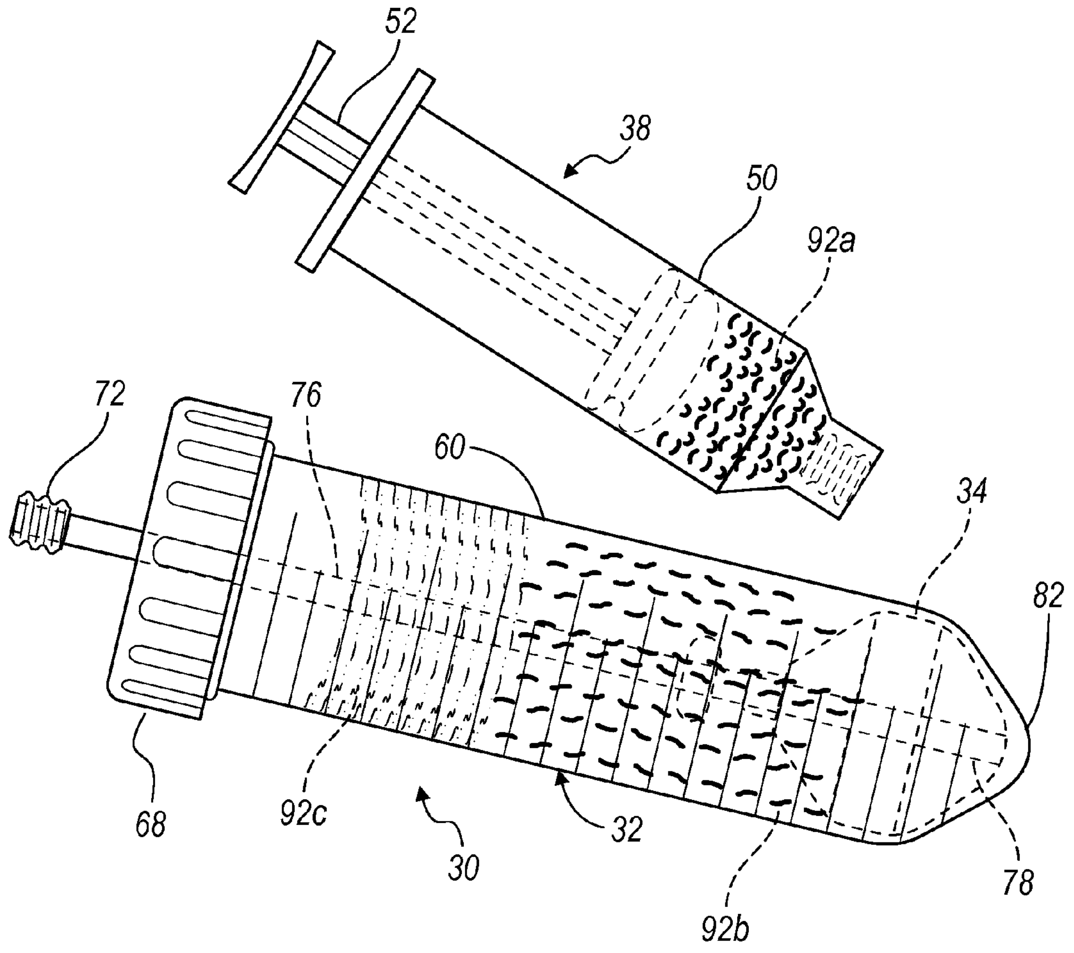
FIG. 8 illustrates the environmental view after a selected component has been withdrawn from the separating device.

With reference to FIGS. 7A and 8, the piston 34 can remain or, again, move to substantially fill the internal volume of the distal portion 82 of the separation tube 32 as it moves toward the distal end 82 as the component is withdrawn. Therefore, the piston 34 can also assist in withdrawing the material from the separation tube 32. Since the piston 34 can substantially fill the volume of the material 92*a* being withdrawn from the separation tube 32, it can help insure that substantially all of the volume of the material 92*a* is withdrawn from the separation container 32.

Therefore, the separation device 30 can assist in separating, concentrating, and collecting a selected biological component of the biological material 92. It will be understood that while collecting stromal cells from a sonicated adipose tissue is described that the separation, concentration, and collection of any selected biological component may be performed. One skilled in the art will understand that the separation device 30 can be used with any appropriate biological material that can be positioned in the separation tube 32.

The separation device 30 can be used to separate and concentrate a selected volume of material from a substantially small volume of the whole biological material 92. Because the separation system 30 includes the various components, including the withdrawal tube 76 that extends substantially the length of the separation container 32, and the piston 34, the biological material 92 can be effectively separated and concentrated into various components. The denser component 92*a* can be easily withdrawn from the separation tube 32 without interference of the other components of the biological material 92.

The withdrawn material, which may include the stromal cells, can then be used for various purposes. The withdrawn material can include the selected biological component, such as stromal cells, mesenchymal stem cells, or other stem cells. The stromal cells that are collected from the selected biological material, such as adipose tissue, can be applied to various portions of the anatomy to assist in healing, growth, regeneration, and the like. For example, during an orthopedic procedure, an implant may be positioned relative to a bony structure. The stromal cells or other components can be applied near the site of the implantation, to the implant before implantation, to an area of removed bone, or the like, to assist in regeneration of growth of the bone. The stem cells, such as the stromal or mesenchymal cells, can assist in healing and growth of the resected bone. Therefore, the separated and concentrated biological component, which can include the stromal cells or other appropriate biological components, can be applied to assist in regeneration, speed healing after a procedure, or other appropriate applications. Briefly, the undifferentiated cells can differentiate after implantation or placement in a selected portion of the anatomy. Alternatively, the cells can release factors that direct the activity of other cells to assist in regeneration, speed healing, or other appropriate applications.

Figure 9:
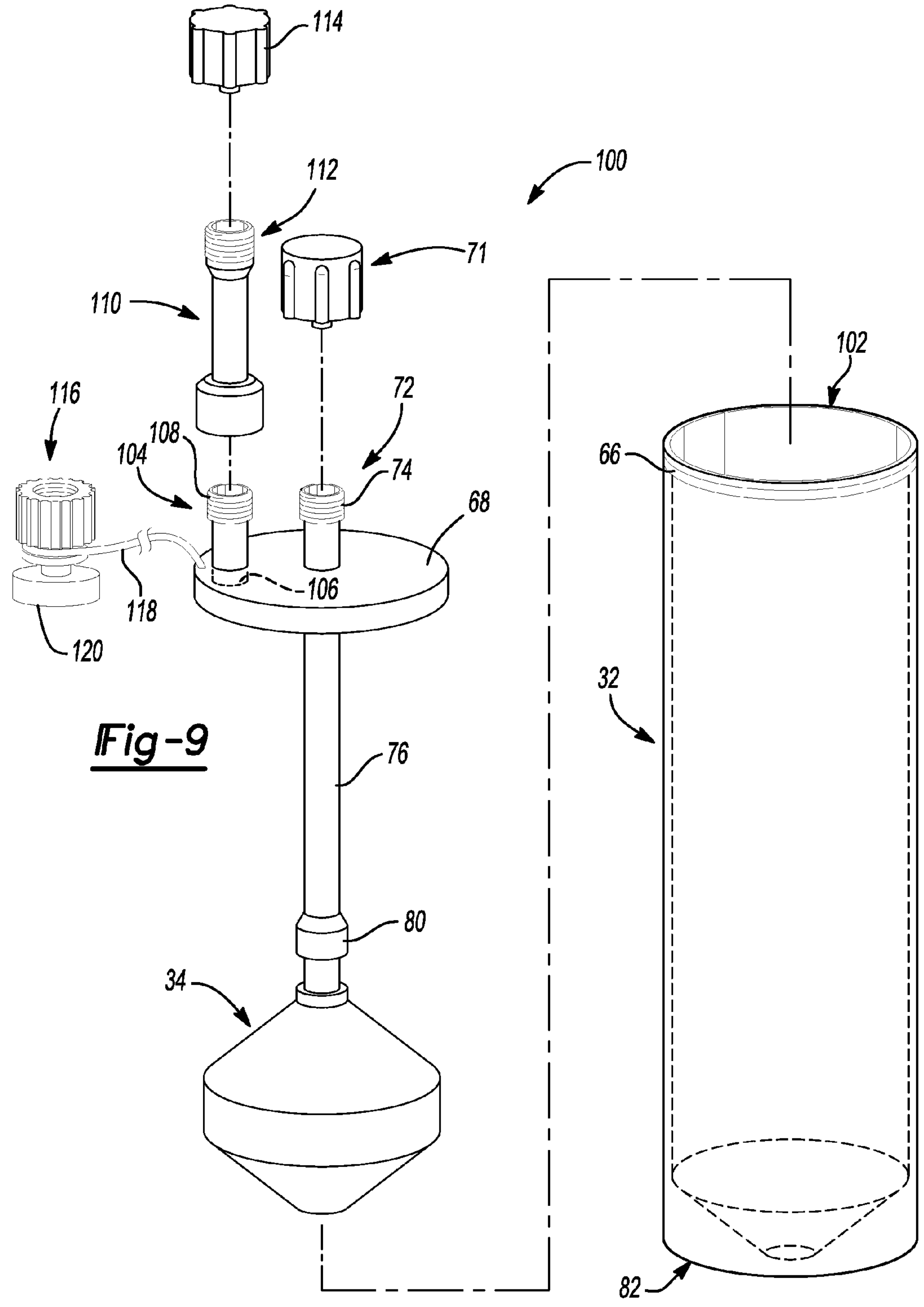
FIG. 9 is an exploded perspective view of a separation device according to various embodiments.
Figure 10:
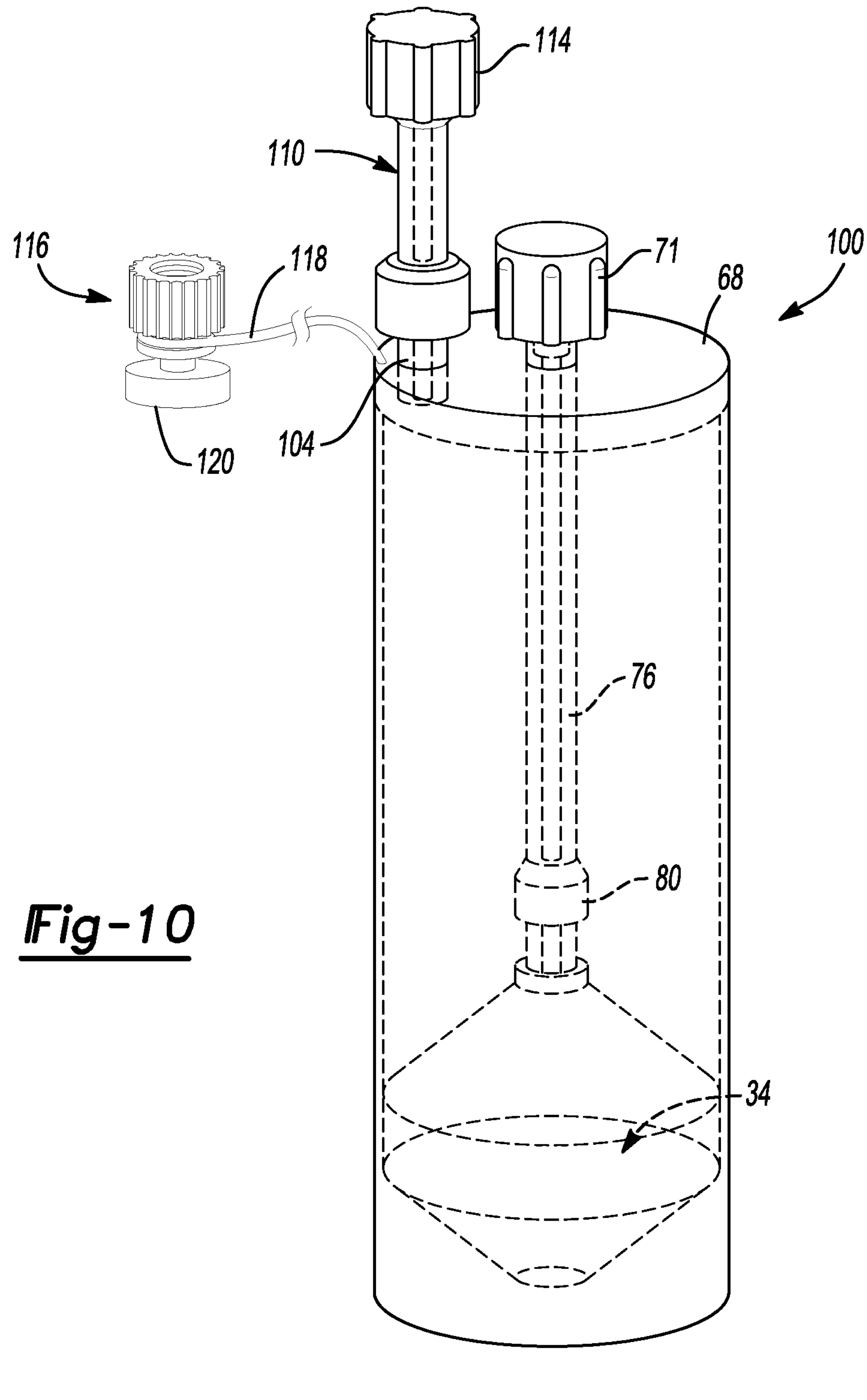
FIG. 10 is an assembled view of a separation device according to various embodiments.

With reference to FIGS. 9 and 10, the kit 20 can include a separation device 100 that is similar to the separation device 30. While the separation device 100 differs from the separation device 30 in various aspects those identical portions will be referenced with identical reference numerals. Briefly, the separation device 100 can include the separation container 32 or tube. Further, the separation device 100 can include the piston 34. The piston 34 can be positioned within the tube 32 of the separation device 100. The separation device 100 can also include the cap or top wall 68. According to various embodiments, the top wall 68 can be substantially fixed to a proximal end 102 of the tube 32. As discussed above, the top wall 68 can also threadably engage a cap engaging region 64 of the tube 32. An adhesive can be used to fix the cap or top wall 68 to the proximal end 102 of the tube 32 or the two can be formed as a single member.

The separation device 100 can differ from the separation device 30 according to various features. For example, the separation device 100 can include an injection port or second port 104. The injection port 104 can extend between an outlet end 106 and an inlet end 108. The inlet end 108 can also include a connection portion, such as a quarter turn or luer connection that can interconnect with an injection port extender 110. The injection port extender 110 can include a top or injection end 112. A cap 114 can be positioned over the top 112 of the extension 110. The top 112 can include a connection portion, such as a luer lock or other connection portion to connect with the cap 114 or an injection syringe, as discussed further herein.

The separation device 100 can also include a second injection port cap 116. The second injection port cap 116 can be tethered to the top wall 68 with a tether 118. The second injection port cap 116 can also include a sterile contact or holding member 120 that can be removed after use. The second injection port cap 116 can include a luer connection or fixation port to connect to the injection port 104 at the top or connection portion 108.

The injection port 104 allows the material to be injected through the top wall 68 into the tube 32. The top wall 68 can, therefore, be fixed to the proximal end 102 of the tube 32 while the material is being injected or delivered to the tube 32. This can allow the multi-component material 92 to be delivered into the tube 32 in an efficient manner and can also maintain the position of the piston 34 near the distal end 82 of the tube 32. Also, any appropriate mixing material can be added at any appropriate time from the syringe 40 or other source. According to various embodiments, the top wall or cap 68 can be removed a small amount and the material 92 can be delivered through the top end or proximal end 102 of the tube 32. Providing the injection port 104, however, can provide a mechanism and port to inject the material into the injection tube without removing the cap 68 from the tube 32.

Figure 11:
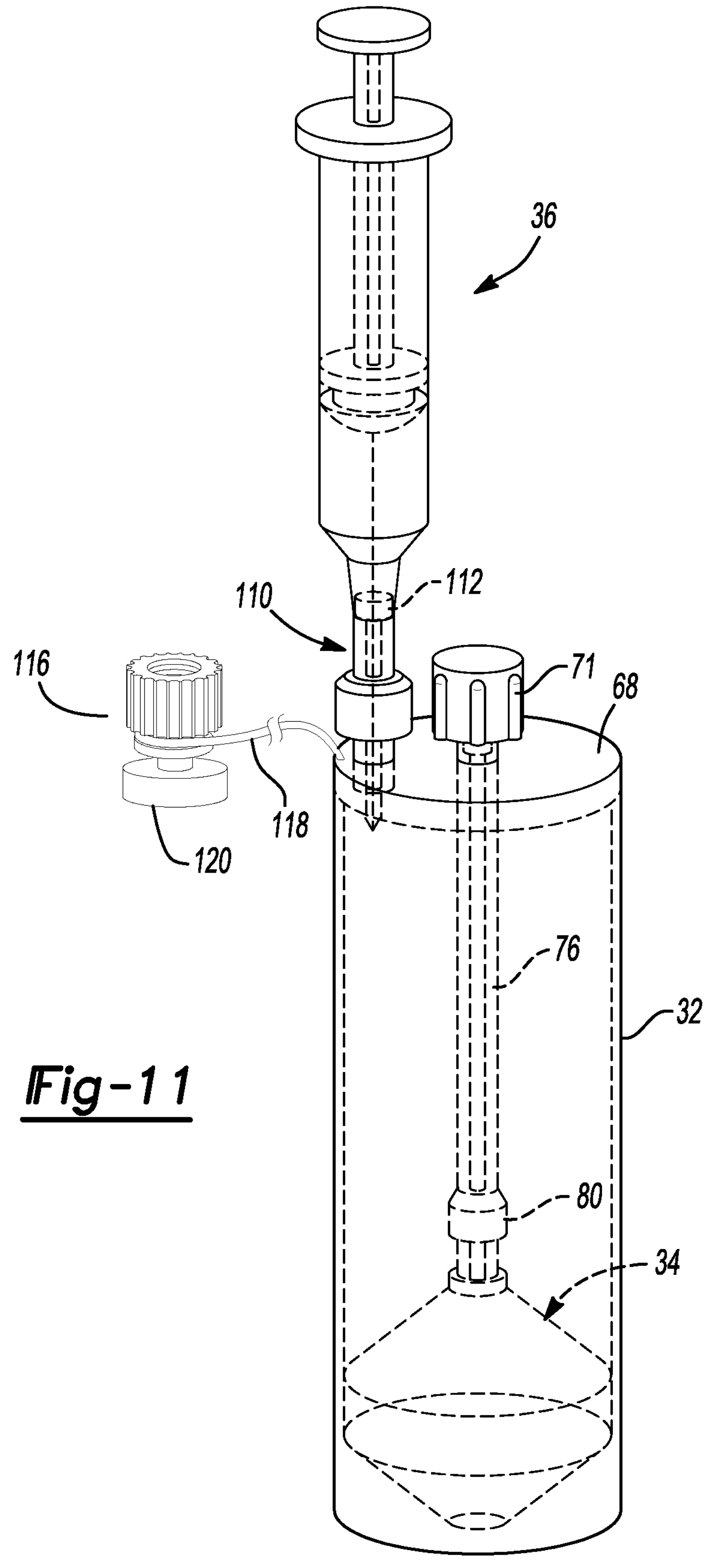
FIG. 11 is a detail view of a syringe interacting with a separation device according to various embodiments.

With additional reference to FIG. 11, the collection device or syringe 36 can be interconnected with the extension 110 that is interconnected with the injection port 104. The collection syringe 36, as discussed above, can be used to collect the multi-component fluid 92. The multi-component fluid 92 can be injected into the tube 32 of the separation device 100. The separation device 100 can include the top wall 68 substantially fixed to the tube 32. The extraction port 72 can also be positioned relative to the cap 68 and be interconnected with the conduit 76.

The extension 110 can allow the collection syringe 36 to be interconnected with the injection port 104 in a manner that allows access without interference of the extraction port 72. The extension 110, as discussed above, can include the luer connection near the top end 112 of the extension 110 to interconnect with the collection syringe 36. Therefore, the syringe 36 can be efficiently connected to the extension 110 which is connected to the injection port 104.

Once the material is injected into the tube 32 through the injection port 104, the extension 110 can be removed from the injection port 104. After the extension 110 is removed from the injection port 104, the second injection port cap 116 can be interconnected with the injection port 104. The sterile holder 120 on the second injection port cap 116 can be used to effectively maintain sterility between the second injection port cap 116 and the injection port 104. The second injection port cap 116 can be positioned over the injection port 104 during the centrifugation process and the extraction process from the tube 32.

The separation device 100 can be used in a manner substantially identical to the separation device 30, discussed above. It will be understood that the extension 110 is not required, and can be provided according to various embodiments or when selected by a user. Further, the separation device 100 can be included in the kit 20, either with the separation device 30 or as an alternative thereto. Therefore, one skilled in the art will understand, the separation device 100 can be included with the kit 20 and used as the separation device 30 discussed above. In addition the separation devices 30, 100 and the kit 20 can be used in various procedures, such as wound healing, including stromal cells from adipose tissue and other blood components, as taught in U.S. Provisional Application No. 60/900,758, filed on Feb. 9, 2007, incorporated herein by reference.

The teachings are merely exemplary in nature and, thus, variations that do not depart from the gist of the teachings are intended to be within the scope of the teachings. Such variations are not to be regarded as a departure from the spirit and scope of the teachings.

What is claimed is:

1. A method of separating a component from a selected material, comprising:

obtaining the selected material having multiple components;

providing a separation system including a tube having a top wall and a bottom wall, a piston within the tube, an input port defined through the top wall, an extraction port defined through the top wall, a hollow member extending from the extraction port at least to the piston;

positioning the selected material into the separation system through the input port with the top wall fixed to the tube and between the top wall and the piston; centrifuging the separation system containing the selected material thereby causing and allowing the piston to move towards the top wall during centrifugation; and extracting the component from the selected material through the hollow tube from past an entire structure of the piston and between an exterior wall of the piston and the bottom wall of the tube.

2. The method of claim 1, wherein positioning the selected material into the separation system includes positioning the selected material substantially only between the top wall and a first top side of the piston.

3. The method of claim 2, wherein centrifuging the separation system and allowing the piston to move towards the top wall includes:

separating the selected material into separate components; and allowing the piston to move relative to a first of the components wherein at least a portion of the first component is positioned between the bottom wall of the tube and the exterior wall of the piston that includes a second external bottom side of the piston.

4. The method of claim 3, wherein extracting the component includes withdrawing at least a portion of the first component from between the bottom wall of the tube and the second external bottom side of the piston through the hollow member.

5. The method of claim 1, further comprising:

providing the hollow member substantially rigidly within the tube;

providing a stop member extending from the hollow member; and stopping the piston from moving towards the top wall during centrifugation with the stop member.

6. The method of claim 1, further comprising:

coupling a separate injection port extender to the input port before positioning a selected material into the separation system; and coupling a collection device that collected the selected material to the injection port extender.

7. The method of claim 1, further comprising:

coupling a collection device to the input port of the separation system to position the selected material into the separation system.

8. The method of claim 4, wherein withdrawing at least a portion of the first component from between the bottom wall of the tube and the second external bottom side of the piston through the hollow member further includes withdrawing a portion of the first component through first top side and the second external bottom side of the piston.

9. A method of separating a component from a selected material, comprising:

obtaining the selected material with a collection device;

engaging the collection device to an input port of a separation system having a container that includes a top wall and a bottom wall, a piston within the container, and a withdrawal tube extending to the piston;

delivering the selected material through the input port of the separation system with the collection device;

removing the collection device from the separation system;

centrifuging the separation system containing the selected material; and extracting the selected component from the selected material through the withdrawal tube within the collection device from past an entire structure of the piston and between a bottom external terminal wall of the piston and the bottom wall of the container.

10. A method of separating a component from a selected material, comprising:

obtaining the selected material with a collection device;

engaging the collection device to an input port of a separation system having a container that includes a top wall and a bottom wall, a piston within the container, and a withdrawal tube extending to the piston;

delivering the selected material through the input port of the separation system with the collection device;

removing the collection device from the separation system;

centrifuging the separation system containing the selected material;

extracting the component of the selected material from between the piston and the bottom wall of the container;

allowing the piston to move toward the top wall during centrifugation; and allowing the piston to engage a stop member extending from the withdrawal tube to stop the piston from moving toward the top wall.

11. The method of claim 9, wherein extracting the component includes withdrawing at least a portion of the component from between the bottom wall of the container and the bottom external terminal wall of the piston through a withdrawal port in communication with the withdrawal tube.

12. The method of claim 11, further comprising:

withdrawing at least a portion of the component through the piston and the withdrawal tube upon coupling a withdrawal container to the withdrawal port.

13. The method of claim 9, wherein delivering the selected material further includes positioning the selected material substantially only between the top wall and a first side of the piston.

14. The method of claim 10, further comprising:

wherein allowing the piston to move toward the top wall during centrifugation includes allowing the piston to move along the withdrawal tube during centrifugation until the piston engages the stop member extending from the withdrawal tube.

15. A method of separating a component from a selected material, comprising:

collecting the selected material with a collection device;

coupling the collection device to an input port of a separation system having a container that includes a top wall, a bottom wall and a piston movable on a withdrawal tube within the container;

delivering the selected material through the input port of the separation system with the collection device;

removing the collection device from the separation system;

positioning the separation system in a centrifuge to apply a force to the selected material in the separation system to allow the piston to move toward the top wall of the container during centrifugation and sequester the component between the piston and the bottom wall of the container;

withdrawing the component from the separation system through the withdrawal tube; and allowing the piston to move toward the top wall during centrifugation until the piston engages a stop member extending from the withdrawal tube.

16. The method of claim 15, wherein withdrawing the component further includes withdrawing stromal cells from the separation system.

17. The method of claim 15, wherein sequestering the component from the selected material further includes holding the piston at a selected position relative to the withdrawal tube and holding the piston fixed relative to the component of the selected material.

18. The method of claim 15, wherein withdrawing the component of the selected material further includes coupling a withdrawal device to a withdrawal port of the container and withdrawing the component through the piston and the withdrawal tube.

19. The method of claim 15, further comprising:

coupling an injection port extender to the input port before coupling the collection device to the input port of the separation system.

* * * * *